(12) United States Patent
Yukawa et al.

(10) Patent No.: US 6,729,373 B2
(45) Date of Patent: May 4, 2004

(54) TIRE NOISE REDUCING SYSTEM

(75) Inventors: Naoki Yukawa, Kobe (JP); Tokuzo Nakajima, Kobe (JP); Masami Nishikawa, Kobe (JP); Chieko Aoki, Kobe (JP); Hideaki Sugihara, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/941,565

(22) Filed: Aug. 30, 2001

(65) Prior Publication Data
US 2002/0059971 A1 May 23, 2002

(30) Foreign Application Priority Data

Aug. 31, 2000 (JP) ........................................ 2000-263518
Aug. 31, 2000 (JP) ........................................ 2000-263519
Oct. 13, 2000 (JP) ........................................ 2000-314100

(51) Int. Cl.$^7$ .............................. B60C 5/00; B60C 19/00
(52) U.S. Cl. ...................... 152/450; 152/151; 152/381.3
(58) Field of Search ................................ 152/450, 151, 152/155, 157, 375, 378 R, 379.3, 381.3, 381.6

(56) References Cited

FOREIGN PATENT DOCUMENTS

| DE | 30 42 350 A1 | 5/1982 | | |
|---|---|---|---|---|
| DE | 198 06 935 A1 | 9/1999 | | |
| EP | 0 911 185-2 | * | 4/1999 | ................. 152/450 |
| EP | 1 125 771 A2 | | 8/2001 | |
| JP | 62050203 A | * | 3/1987 | ................. 152/450 |
| JP | 63 137 005 A | | 6/1988 | |
| JP | 06 106 903 A | | 4/1994 | |
| JP | 07052616 A | * | 2/1995 | ................. 152/540 |

* cited by examiner

Primary Examiner—Adrienne C. Johnstone
(74) Attorney, Agent, or Firm—Birch, Stewart, Kolasch & Birch, LLP

(57) ABSTRACT

A tire noise reducing system comprises a wheel rim, a pneumatic tire to be mounted on the wheel rim and a noise damper to be disposed in an annular tire cavity enclosed by the wheel rim and the pneumatic tire mounted thereon, wherein the noise damper is made of a multi-cellular material whose volume S2 is in a range of not less than 0.4% of the volume S1 of said annular tire cavity. Preferably, the specific gravity of the damper is set in a range of from 0.005 to 0.06.

10 Claims, 4 Drawing Sheets

TIRE NOISE REDUCING SYSTEM

BACKGROUND OF THE INVENTION

The present invention relates to a tire noise reducing system, more particularly to a noise damper for a pneumatic tire.

In recent years, as the mechanical noise from automobiles especially passenger cars is greatly reduced, the tires especially passenger car tires are strongly required to reduce their noise. There are many factors in the tire noise, but a circumferential resonance of the air in the annular tire cavity is a major factor. That is, a ring of air inside the tire continuous around the rim is excited by vibrations during running and resonates in the circumferential direction. Usually, a resonance peak occurs in a frequency range of from 50 to 400 Hz according to the tire size.

In the published Japanese patent JP-B-7-14682, an assembly of a wheel rim and a pneumatic tire mounted thereon is disclosed, wherein a ball-like body which is made of rubber, sponge or the like is put in the annular tire cavity to block the circumferential continuity thereof to control resonance.

In case of such a ball-like body, however, it has a tendency to make it difficult to mount the tire on a wheel rim.

BRIEF SUMMARY OF THE INVENTION

It is therefore, an object of the present invention to provide a tire noise reducing system in which, by using a spongelike multi-cellular material having specific properties, the resonance noise is effectively reduced without hindering tire mounting operation.

According to the present invention, a tire noise reducing system comprises a wheel rim, a pneumatic tire to be mounted on the wheel rim and a noise damper to be disposed in an annular tire cavity enclosed by the wheel rim and the pneumatic tire mounted thereon, wherein the noise damper is made of multi-cellular material whose volume S2 is in a range of not less than 0.4% of the volume S1 of the annular tire cavity. Preferably, the specific gravity of the noise damper is in a range of from 0.005 to 0.06.

Here, the volume S1 of the tire cavity is defined by the following approximation expression $$A \times \{(Di-Dr)/2+Dr\} \times pi$$

wherein
A is the cross sectional area of the tire cavity under a standard state,
Di is the maximum outer diameter of the tire cavity under the standard state,
Dr is the diameter of the wheel rim, and
pi is the ratio of the circumference of a circle to its diameter.

The above-mentioned "A" and "Di" can be easily obtained by CT scanning.

The standard state is that the tire is mounted on the wheel rim and inflated to a standard pressure but loaded with no tire load. The standard pressure is the "maximum air pressure" specified in JATMA, the "Inflation Pressure" in ETRTO, the maximum pressure given in the "Tire Load Limits at Various Cold Inflation Pressures" table in T&RA or the like. In case of passenger car tires, however, 200 kPa is used as the standard pressure.

The volume of the noise damper means the apparent volume of the spongelike multi-cellular material inclusive of the total volume of the cells under the above-mentioned standard pressure.

BRIEF DESCRIPTION OF THE DRAWINGS

Embodiments of the present invention will now be described in detail in conjunction with the accompanying drawings.

DETAILED DESCRIPTION OF THE DRAWINGS

Figure 1:
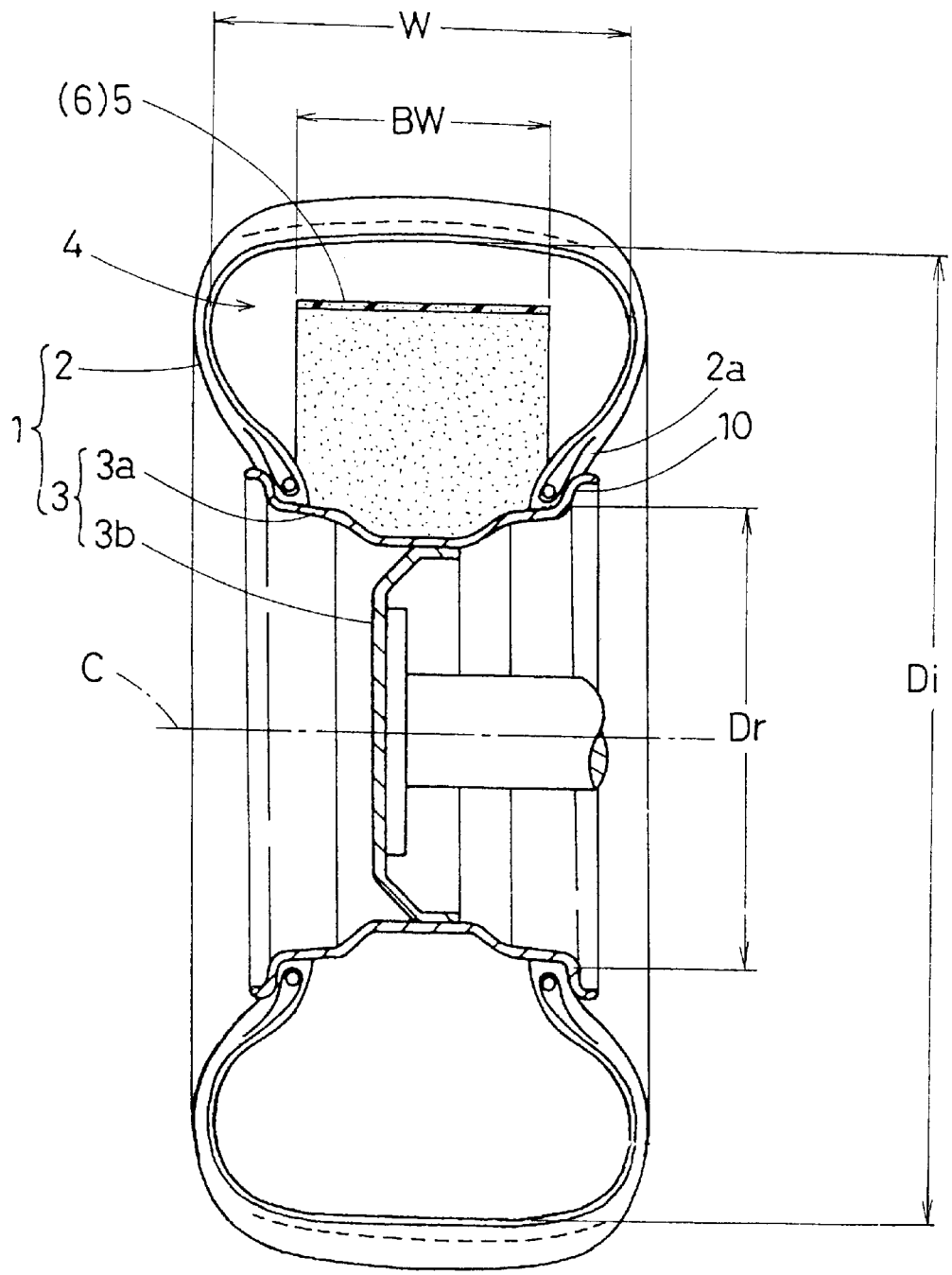
FIG. 1 is a cross sectional view of a pneumatic tire, a wheel rim and a noise damper which are assembled and the tire is inflated to the standard pressure.

A tire noise reducing system according to the present invention comprises a pneumatic tire 2, a wheel rim 3a on which the tire 2 is mounted, and a noise damper 6 to be disposed in a tire cavity 4.

The pneumatic tire 2 comprises a tread portion, a pair of sidewall portions and a pair of axially spaced bead portions 2a which continue in a U-shape in the tire meridian section and make a open tire hollow. For example, the tire 2 is a tubeless radial tire for passenger cars of which inside facing the tire hollow is covered with air-impermeable inner liner rubber.

In the example shown in FIG. 1, the rim 3a makes up a two-piece wheel 3 together with a wheel disk 3b. The rim 3a comprises a pair of bead seats 10 on which the tire bead portions seat, a center well for tire mounting, and a pair of flanges each extending radially outwardly from one of the bead seats.

When the pneumatic tire 2 is mounted on the wheel rim 3a, the open tire hollow is closed and an annular closed tire cavity 4 is formed.

In the tire cavity 4, the noise damper 6 is disposed.

The noise damper 6 is made of multi-cellular material 5 of an open-cell type or a closed-cell or isolated-cell type.

Here, the multi-cellular material 5 means foamed plastic and foamed rubber such as rubber sponge, polyurethane foam, artificial sponge, cellulose sponge, sponge cucumber and the like, and nonwoven fabric of synthetic fiber, animal fiber, vegetable fiber or the like.

In this embodiment, an open-cell type polyurethane foam is used.

The volume S1 of the noise damper 6 is not less than 0.4%, preferably not less than 1.5%, more preferably not less than 2.5%, still more preferably not less than 4% of the tire cavity 4. But, the volume S1 is preferably not more than 20%, more preferably not more than 15% of the volume S2.

The specific gravity of the noise damper 6 is set in a range of from 0.005 to 0.06, preferably 0.010 to 0.05, more preferably 0.016 to 0.05, still more preferably 0.016 to 0.035.

Here, the volume S1 means the apparent volume of the multi-cellular material inclusive of the total volume of the cells. In case of open-cell type material, the volume may be defined independently of the ambient air pressure. In case of closed-cell type material, however, the volume may be defined under the above-mentioned standard pressure at a temperature of about 25 to 50 deg.C. because there is a possibility that the volume of the cells varies. Likewise, as to the specific gravity, in case of closed-cell type material, it may be defined under the standard pressure at a temperature of about 25 to 50 deg.C. for the same reason as above.

The damper 6 in the tire cavity 4 has to extend in the tire circumferential direction for a certain length. Thus, the length L is set in a range of not less than 250 mm, preferably not less than 300 mm, more preferably 300 to 1500 mm. The thickness is set in a range of from 2 to 30 mm, preferably 3 to 20 mm, more preferably 7 to 15 mm.

The width BW is set in a range of not less than 20%, preferably 40 to 100%, more preferably 70 to 90% of the maximum section width W of the tire cavity 4 under the above-mentioned standard state.

If the length is less than 250 mm, the thickness is less than 2 mm and/or the width BW is less than 20%, then it is difficult to absorb noisy sound of tire cavity resonance. If the thickness is more than 30 mm, there is a possibility that the tire loses its rotational balance.

If the width BW is more than 90% of the maximum width W and/or the length L is more than 1500 mm, then there is a possibility that the weight increase becomes not negligible although the noise reducing effect is not improved so much.

Figure 2:
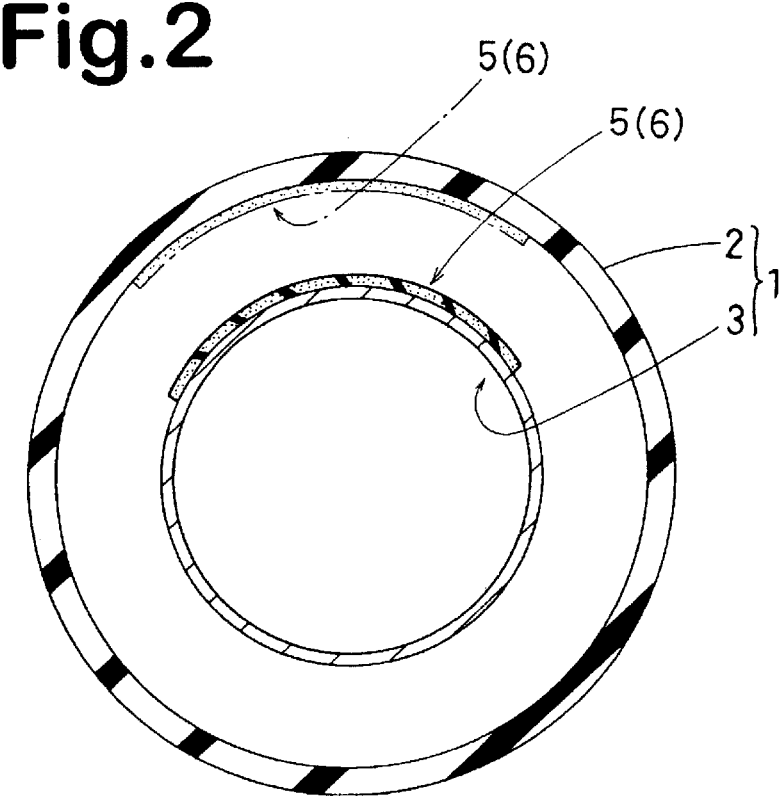
FIG. 2 is a cross sectional view of the assembly for explaining positions of the noise damper.

FIG. 2 shows an example of the shape of the damper 6, wherein the shape is a rectangle such that the length in the tire circumferential direction is more than the width in the tire axial direction.

It is possible that the damper 6 is put in the tire cavity 4 without being fixed to any of the tire 2 and the wheel rim 3. It is also possible to partially or wholly fix the damper 6 to the tire 2 or the wheel rim 3 as shown in FIG. 2 by a solid line and a chain line.

In this example, a continuous ring of an expandable multi-cellular material 5 is preferably used as the damper because by expanding the damper it can be easily put around the wheel rim.

Figure 3:
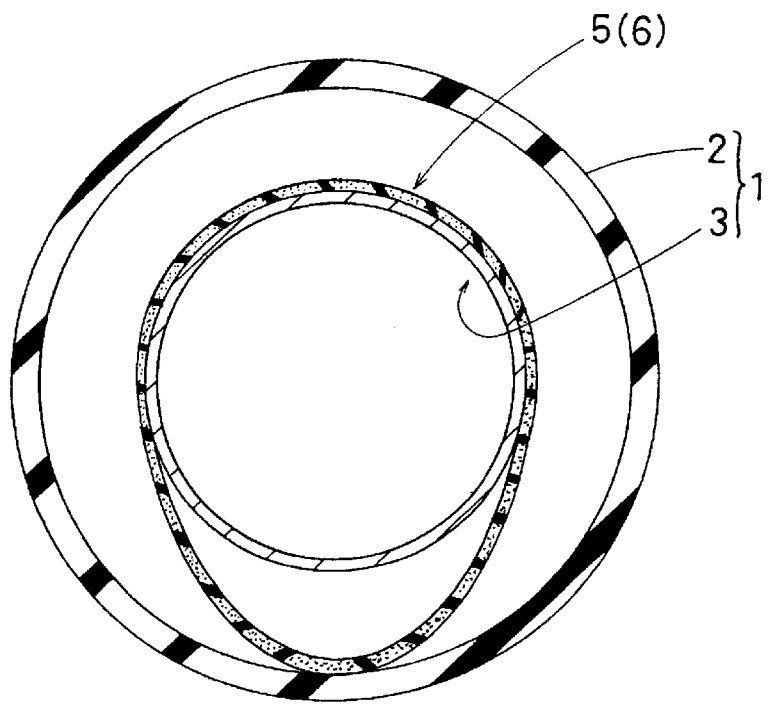
FIG. 3 is a cross sectional view showing another example of the damper.

When mounting the tire on the wheel rim, it may be possible to contract the damper into the rim well not to hinder the mounting operation. In FIG. 3, the loop slacks so that the loop slightly touches to the inner surface of the tread portion of the tire. To make the loop, it is also possible to wind a long strip of the multi-cellular material 5 around the rim well. Both the ends of the strip may be connected to each other or fixed to the wheel rim.

Comparison Tests

Various dampers were made and tested for noise.

In the noise test, the assembly of a pneumatic tire, a wheel rim and a damper was mounted on a test car and run in a noise test course (rough asphalt road) at a speed of 60 km/hr, and the sound pressure was measured near the driver's seat to obtain the overall noise level of 226, 240 and 253 Hz. The results are indicated in dB as a difference from a reference tire provided with no damper, wherein the minus sign means that the noise was reduced.

Comparison Test 1

Figure 4:
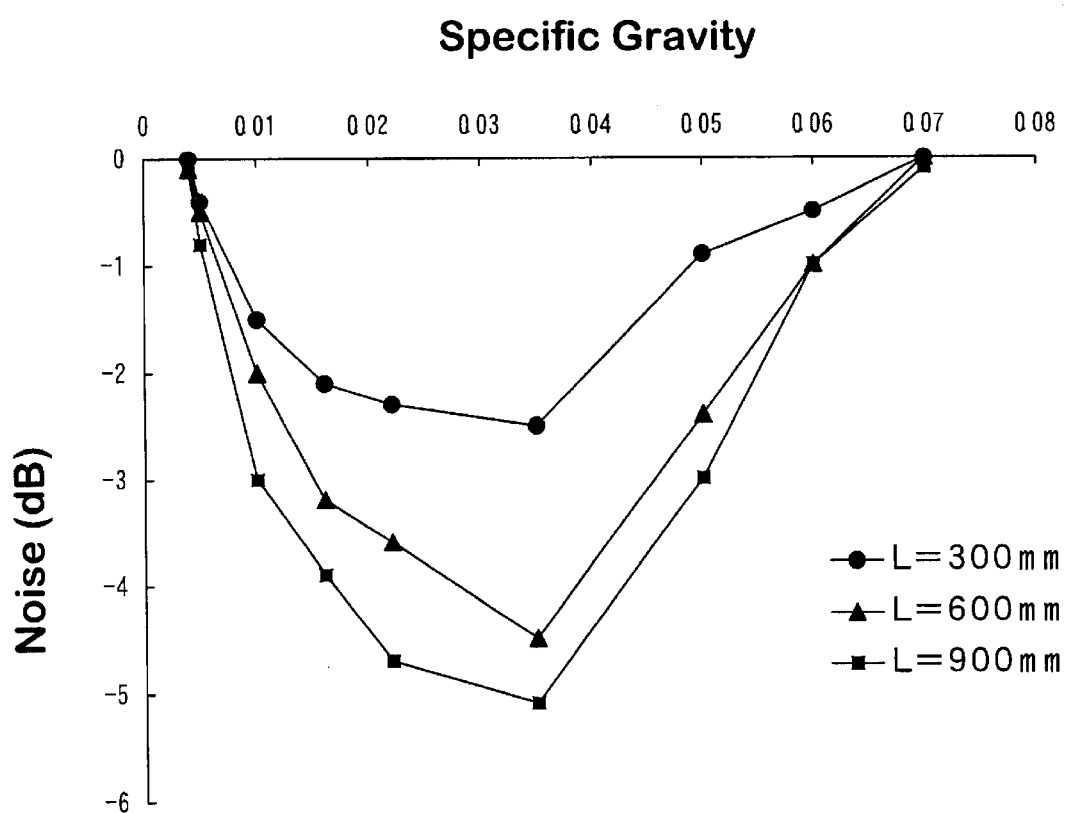
FIG. 4 is a graph showing noise sound level as a function of the specific gravity.

Tables 1A, 1B and 1C each show a change in the noise level when only the specific gravity of the damper was changed. Each damper was made of open-cell type polyurethane foam and disposed in the cavity without being fixed. These data are also plotted on a graph shown in FIG. 4.

TABLE 1A

S2/S1 = 4.97%, S2 = 990 cm³ (900 mm long × 110 mm width × 10 mm thick)

Damper

| Specific gravity | 0.004 | 0.005 | 0.01 | 0.016 | 0.022 | 0.035 | 0.049 | 0.06 | 0.068 | 0.079 |
|---|---|---|---|---|---|---|---|---|---|---|
| Noise (dB) | −0.6 | −1.4 | −3 | −3.9 | −4.7 | −5.1 | −3 | −1.8 | −0.8 | −0.6 |

TABLE 1B

S2/S1 = 3.31%, S2 = 660 cm³ (600 mm long × 110 mm width × 10 mm thick)

Damper

| Specific gravity | 0.004 | 0.005 | 0.01 | 0.016 | 0.022 | 0.035 | 0.049 | 0.06 | 0.068 | 0.079 |
|---|---|---|---|---|---|---|---|---|---|---|
| Noise (dB) | −0.5 | −1.1 | −2 | −3.2 | −3.6 | −4.5 | −2.4 | −1.5 | −0.6 | −0.5 |

TABLE 1C

S2/S1 = 1.66%, S2 = 330 cm³ (300 mm long × 110 mm width × 10 mm thick)

Damper

| Specific gravity | 0.004 | 0.005 | 0.01 | 0.016 | 0.022 | 0.035 | 0.049 | 0.06 | 0.068 | 0.079 |
|---|---|---|---|---|---|---|---|---|---|---|
| Noise (dB) | −0.3 | −1 | −1.5 | −2.1 | −2.3 | −2.5 | −1.2 | −0.9 | −0.5 | −0.4 |

Test car: Japanese 1500 cc FF passenger car
Wheel rim size: 15×5JJ
Tire size: 165/65R15 81S
Cross section area (A) of tire cavity: 13464 mm²
Maximum section width W of tire cavity: 153 mm Further, it is possible to fix the damper 6 to the tire 2 and the wheel rim 3, bridging therebetween for example by utilizing a centrifugal force and the like.

Usually, adhesive agents are used to fix the damper 6. But, metal fittings, screws and the like may be used too when the damper 6 is fixed to the wheel rim 3.

FIG. 3 shows another example of the shape, wherein the damper 6 loops around the wheel rim 3a.

Comparison Test 2

Tables 2A and 2B show a change in the noise level when the size of the damper was changed with maintaining a specific gravity of 0.022. Each damper was made of open-cell type polyurethane foam and disposed in the cavity without being fixed.

Figure 5:
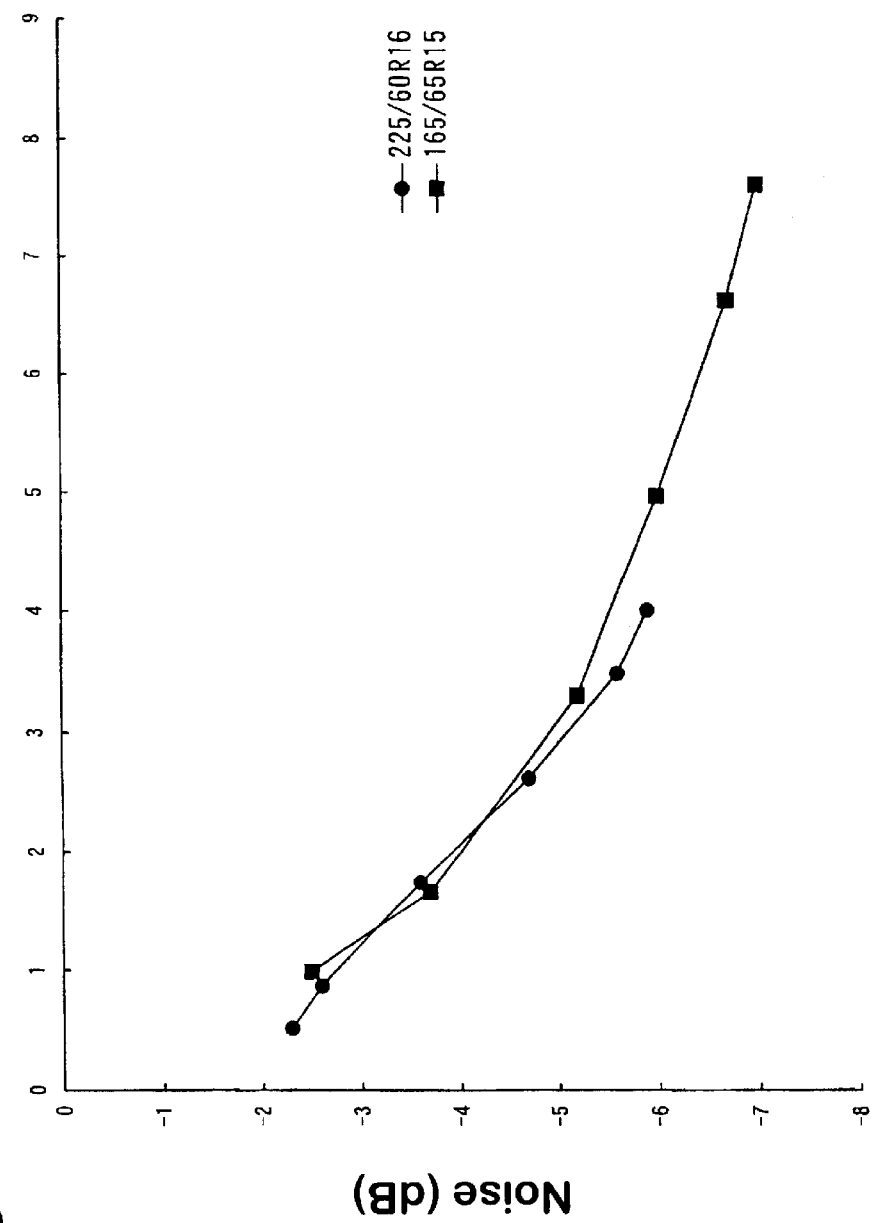
FIG. 5 is a graph showing noise sound level as a function of the damper volume.

The first six data in Table 2A and the first six data in Table 2B are plotted on a graph shown in FIG. 5.

TABLE 2A

| Damper | | | | | | | | |
|---|---|---|---|---|---|---|---|---|
| Volume S2 (cm³) | 198 | 330 | 660 | 990 | 1320 | 1518 | 5500 | 7700 |
| Thickness (mm) | 10 | 10 | 10 | 10 | 10 | 10 | 50 | 70 |
| Width (mm) | 110 | 110 | 110 | 110 | 110 | 110 | 110 | 110 |
| Length (mm) | 180 | 300 | 600 | 900 | 1200 | 1380 | 1000 | 1000 |
| S2/S1 (%) | 0.52 | 0.87 | 1.74 | 2.62 | 3.49 | 4.01 | 14.53 | 20.34 |
| Noise (dB) | −2.3 | −2.6 | −3.6 | −4.7 | −5.6 | −5.9 | −8.9 | −9.1 |

Test car: Japanese 4000 cc FR passenger car
Wheel rim size: 16×7JJ
Tire size: 225/60R16 98H
Inner pressure: 200 KPa
Cross section area of cavity: 23174 mm²
Maximum width of cavity: 214 mm

TABLE 2B

| Damper | | | | | | | | |
|---|---|---|---|---|---|---|---|---|
| Volume S2 (cm³) | 198 | 330 | 660 | 990 | 1320 | 1518 | | |
| Thickness (mm) | 10 | 10 | 10 | 10 | 10 | 10 | | |
| Width (mm) | 110 | 110 | 110 | 110 | 110 | 110 | | |
| Length (mm) | 180 | 300 | 600 | 900 | 1200 | 1380 | | |
| S2/S1 (%) | 0.99 | 1.66 | 3.31 | 4.97 | 6.63 | 7.62 | | |
| Noise (dB) | −2.5 | −3.7 | −5.2 | −6 | −6.7 | −7 | | |
| Volume S2 (cm³) | 330 | 420 | 540 | 165 | 210 | 270 | | |
| Thickness (mm) | 10 | 10 | 10 | 10 | 10 | 10 | | |
| Width (mm) | 55 | 70 | 90 | 55 | 70 | 90 | | |
| Length (mm) | 600 | 600 | 600 | 300 | 300 | 300 | | |
| S2/S1 (%) | 1.66 | 2.11 | 2.71 | 0.83 | 1.05 | 1.36 | | |
| Noise (dB) | −3.3 | −3.9 | −4.4 | −2.8 | −3.2 | −3.3 | | |
| Volume S2 (cm³) | 1320 | 330 | 660 | 165 | 660 | 165 | 330 | 83 |
| Thickness (mm) | 20 | 5 | 20 | 5 | 20 | 5 | 20 | 5 |
| Width (mm) | 110 | 110 | 110 | 110 | 55 | 55 | 55 | 55 |
| Length (mm) | 600 | 600 | 300 | 300 | 600 | 600 | 300 | 300 |
| S2/S1 (%) | 6.63 | 1.66 | 3.31 | 0.83 | 3.31 | 0.83 | 1.66 | 0.41 |
| Noise (dB) | −7 | −3.7 | −4.9 | −2.5 | −5.4 | −2.2 | −4.1 | −2.2 |

Test car: Japanese 1500 cc FF passenger car
Wheel rim size: 15×5JJ
Tire size: 165/65R15 81S
Cross section area of cavity: 13464 mm²
Maximum width of cavity: 153 mm Comparison Test 3

Table 3 shows the test results when the damper was fixed or secured. The damper was made of open-cell type polyurethane foam having a specific gravity of 0.022.

TABLE 3

| Damper | loop *1 | tire *2 | tire *2 | rim *3 |
|---|---|---|---|---|
| Volume S2 (cm³) | 1518 | 330 | 660 | 660 |
| Thickness (mm) | 10 | 10 | 10 | 10 |
| Width (mm) | 110 | 110 | 110 | 110 |
| Length (mm) | 1380 | 300 | 600 | 600 |
| S2/S1 (%) | 7.62 | 1.66 | 3.31 | 3.31 |
| Noise (dB) | −5.5 | −2.4 | −4.6 | −4.3 |

Test car: Japanese 1500 cc FF passenger car
Wheel rim size: 15×5JJ
Tire size: 165/65R15 81S
Cross section area of cavity: 13464 mm²
Maximum width of cavity: 153 mm
*1: The damper was wound around the wheel rim into a loose loop as shown in FIG. 3 and thus secured to the wheel rim, allowing relative movement.
*2: The damper was bonded to the inner surface of the tread portion.
*3: The damper was bonded to the rim well.

The effectual surface area of the damper decreases when one side of the damper is bonded to the tire or rim. Therefore, there is a possibility that the noise reduction becomes less when compared with a free damper. In case of a loosely looped damper as shown in FIG. 3, it is possible to increase the effectual surface area without increasing a load on the inside of the tire.

Comparison Test 4

Table 4 shows the test results when a damper of open-cell type polyurethane foam which was not fully expanded in its edge portion of about 5 mm width was disposed in the cavity without being fixed. The specific gravity was 0.022.

TABLE 4

| | Ex. 22 | Ex. 23 | Ex. 24 |
|---|---|---|---|
| Damper | | | |
| Volume S2 (cm³) | 990 | 660 | 330 |
| Specific gravity | 0.022 | 0.022 | 0.022 |
| Thickness (mm) | 10 | 10 | 10 |
| Width (mm) | 110 | 110 | 110 |
| Length (mm) | 900 | 600 | 300 |
| S2/S1 (%) | 4.97 | 3.31 | 1.66 |
| Noise (dB) | −4.4 | −3.9 | −2 |

Test car: Japanese 1500cc FF passenger car
Wheel rim size: 15X5JJ
Tire size: 165/65R15 81S
Cross section area of cavity: 13464 mm²
Maximum width W of cavity: 153 mm

What is claimed is:

1. A tire noise reducing system comprising
a wheel rim,
a pneumatic tire to be mounted on the wheel rim and
a noise damper to be disposed in an annular tire cavity enclosed by the wheel rim and the pneumatic tire mounted thereon,
the noise damper made of a strip of a multi-cellular material whose specific gravity is in a range of from 0.016 to 0.035 and volume S2 is in a range of not less than 0.4% of the volume S1 of said annular tire cavity, the noise damper having a thickness in a range of 2 to 30 mm and a length in a range of not less than 250 mm.

2. The tire noise reducing system according to claim 1, wherein the damper has a width of from 20 to 100% of the maximum section width of the tire cavity.

3. The tire noise reducing system according to claim 1 or 2, wherein said thickness is in a range of 2 to 30 mm.

4. The tire noise reducing system according to claim 1 or 2, wherein said thickness is in a range of 7 to 15 mm.

5. The tire noise reducing system according to claim 1 or 2, wherein said length L is in a range of not less than 300 mm.

6. The tire noise reducing system according to claim 1 or 2, wherein said length L is in a range of 300 to 1500 mm.

7. A tire noise reducing system comprising
a wheel rim,
a pneumatic tire to be mounted on the wheel rim and
a noise damper to be disposed in an annular tire cavity enclosed by the wheel rim and the pneumatic tire mounted thereon, wherein
the noise damper is strip of a multi-cellular material having
a specific gravity in a range of from 0.016 to 0.035,
a volume in a range of not less than 0.4% of the volume of said annular tire cavity,
a thickness in a range of 2 to 30 mm and
a length in a range of not less than 250 mm, and
the noise damper in the annular tire cavity is at least partially fixed to the tire and/or the wheel rim.

8. A tire noise reducing system comprising
a wheel rim,
a pneumatic tire to be mounted on the wheel rim and
a noise damper to be disposed in an annular tire cavity enclosed by the wheel rim and the pneumatic tire mounted thereon, wherein
the noise damper is a strip of a multi-cellular material having
a specific gravity in a range of from 0.016 to 0.035,
a volume in a range of not less than 0.4% of the volume of said annular tire cavity,
a thickness in a range of 2 to 30 mm and
a length in a range of not less than 250 mm, and
the noise damper in the annular tire cavity is fixed to the tire and wheel rim, bridging between the tire and the wheel rim.

9. The tire noise reducing system according to any one of claim 1, 7 or 8, wherein said length is such that the damper does not circumferentially extend through the tire cavity.

10. A tire noise reducing system comprising
a wheel rim,
a pneumatic tire to be mounted on the wheel rim and
a noise damper to be disposed in an annular tire cavity enclosed by the wheel rim and the pneumatic tire mounted thereon, wherein
the noise damper is a strip of a multi-cellular material having
a specific gravity in a range of from 0.016 to 0.035,
a volume in a range of not less than 0.4% of the volume of said annular tire cavity,
a thickness in a range of 2 to 30 mm and
a length in a range of not less than 250 mm, and
the noise damper is wound around the wheel rim and both the ends thereof are fixed to the wheel rim so as to form a slack part.

* * * * *